US011645208B2

United States Patent
Campbell et al.

(10) Patent No.: US 11,645,208 B2
(45) Date of Patent: May 9, 2023

(54) TRANSLATION BANDWIDTH OPTIMIZED PREFETCHING STRATEGY THROUGH MULTIPLE TRANSLATION LOOKASIDE BUFFERS

(71) Applicant: International Business Machines Corporation, Armonk, NY (US)

(72) Inventors: David Campbell, Austin, TX (US); Bryan Lloyd, Austin, TX (US); George W. Rohrbaugh, III, Charlotte, VT (US); Vivek Britto, Austin, TX (US); Mohit Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/215,296

(22) Filed: Mar. 29, 2021

(65) Prior Publication Data
US 2022/0309001 A1 Sep. 29, 2022

(51) Int. Cl.
*G06F 12/0862* (2016.01)
(52) U.S. Cl.
CPC .... *G06F 12/0862* (2013.01); *G06F 2212/602* (2013.01); *G06F 2212/681* (2013.01)
(58) Field of Classification Search
CPC ............. G06F 12/0862; G06F 12/1054; G06F 12/1063; G06F 12/0864; G06F 12/0238; G06F 2212/602; G06F 2212/681
See application file for complete search history.

(56) References Cited

U.S. PATENT DOCUMENTS

| 5,963,984 A * | 10/1999 | Garibay, Jr. ........ G06F 12/1027 711/202 |
| 7,793,070 B2 | 9/2010 | Stecher |
| 8,924,651 B2 | 12/2014 | Tang et al. |
| 9,081,706 B2 | 7/2015 | Koka et al. |
| 9,460,022 B2 | 10/2016 | Venkatasubramanian et al. |
| 9,501,425 B2 | 11/2016 | Mukherjee et al. |
| 10,296,465 B2 | 5/2019 | John et al. |
| 10,409,608 B2 | 9/2019 | Vorbach et al. |

(Continued)

FOREIGN PATENT DOCUMENTS

EP 3343353 A1 7/2018

OTHER PUBLICATIONS

Anonymous "High Performance and Low Power First Line Defense for Instruction Translation" IP.com, IPCOM000257688D, Mar. 2, 2019 (2 pages).

(Continued)

*Primary Examiner* — Michael Krofcheck
(74) *Attorney, Agent, or Firm* — Canter Colburn LLP; Brian Restauro

(57) ABSTRACT

A computer system includes a processor and a prefetch engine. The processor is configured to generate a demand access stream. The prefetch engine is configured to generate a first prefetch request and a second prefetch request based on the demand access stream, to output the first prefetch request to a first translation lookaside buffer (TLB), and to output the second prefetch request to a second TLB that is different from the first TLB. The processor performs a first TLB lookup in the first TLB based on one of the demand access stream or the first prefetch request, and performs a second TLB lookup in the second TLB based on the second prefetch request.

14 Claims, 3 Drawing Sheets

(56) References Cited

U.S. PATENT DOCUMENTS

| | | | | |
|---|---|---|---|---|
| 2006/0259735 | A1* | 11/2006 | Anand | G06F 12/1027 711/205 |
| 2010/0268892 | A1 | 10/2010 | Luttrell | |
| 2011/0072235 | A1* | 3/2011 | Deming | G06F 12/1027 711/E12.001 |
| 2014/0149632 | A1* | 5/2014 | Kannan | G06F 12/0862 711/3 |
| 2015/0339233 | A1 | 11/2015 | Kapil et al. | |
| 2017/0286304 | A1 | 10/2017 | Peled et al. | |
| 2018/0095892 | A1 | 4/2018 | Wilkinson et al. | |
| 2018/0150406 | A1* | 5/2018 | John | G06F 12/1063 |
| 2018/0203807 | A1 | 7/2018 | Krueger | |
| 2018/0246815 | A1* | 8/2018 | Smith | G06F 12/1009 |
| 2019/0205263 | A1* | 7/2019 | Fleming | G06F 12/1054 |
| 2020/0133881 | A1* | 4/2020 | Campbell | G06F 12/0893 |
| 2021/0089468 | A1 | 3/2021 | Hao et al. | |

OTHER PUBLICATIONS

Anonymous "Method and Apparatus for Handling Self Modifying Code in Dynamic Binary Translated Simulators" IP.com, IPCOM000245170D, Feb. 16, 2016 (7 pages).

Anonymous "Unified Translation Lookaside Buffer for Host/Guest Translation Results in a Nested Translation Environment" IP.com, IPCOM000249321D, Feb. 16, 2017 (2 pages).

Campbell et al., "Power Optimized Prefetching in Set-Associative Translation Lookaside Buffer Structure", U.S. Appl. No. 17/215,287, filed Mar. 29, 2021.

IBM, "List of IBM Patent Applications Treated As Related", Appendix P, Dated Mar. 30, 2021, 2 pages.

Kandiraju et al., "Going the distance for TLB prefetching: An application-driven study" Proceedings 29th Annual International Symposium on Computer Architecture, IEEE (May 2002) pp. 195-206.

Lustig et al., "TLB improvements for chip multiprocessors: Inter-core cooperative prefetchers and shared last-level TLBs" ACM Transactions on Architecture and Code Optimization (TACO) vol. V, No. N, Article A, (Jan. 2013) pp. 1-30.

Saulsbury et al., "Recency-based TLB preloading" Proceedings of the 27th annual international symposium on Computer architecture (May 2000) pp. 117-127.

Srikantaiah et al., "Synergistic TLBs for high performance address translation in chip multiprocessors" 2010 43rd Annual IEEE/ACM International Symposium on Microarchitecture. IEEE, (Dec. 2010) pp. 313-314.

* cited by examiner

TRANSLATION BANDWIDTH OPTIMIZED PREFETCHING STRATEGY THROUGH MULTIPLE TRANSLATION LOOKASIDE BUFFERS

BACKGROUND

Embodiments of the present invention relate in general to computer processing systems, and in particular, computer processing associated with cache prefetching.

Cache prefetching is a technique used by computer processors to boost execution performance by fetching instructions or data from their original storage in slower memory to a faster local memory before it is actually needed. Most modern computer processors have fast and local cache memory in which prefetched data is held until it is required. The source for the prefetch operation is usually main memory. Because of their design, accessing cache memories is typically much faster than accessing the main memory. Therefore, prefetching data and then accessing it from caches is usually many orders of magnitude faster than accessing it directly from main memory.

SUMMARY

According to a non-limiting embodiment, a computer-implemented method is provided for performing prefetching in a computer processing system. The method comprises generating, by a processor, a demand access stream, and generating, by a prefetch engine, a first prefetch request and a second prefetch request based on the demand access stream. The method further comprises outputting, from the prefetch engine, the first prefetch request to a first translation lookaside buffer (TLB) and the second prefetch request to a second TLB that is different from the first TLB, and performing a first TLB lookup in the first TLB based on one of the demand access stream or the first prefetch request, and performing a second TLB lookup in the second TLB based on the second prefetch request.

According to another non-limiting embodiment, a computer system includes a processor and a prefetch engine. The processor is configured to generate a demand access stream. The prefetch engine is configured to generate a first prefetch request and a second prefetch request based on the demand access stream, to output the first prefetch request to a first translation lookaside buffer (TLB), and to output the second prefetch request to a second TLB that is different from the first TLB. The processor performs a first TLB lookup in the first TLB based on one of the demand access stream or the first prefetch request, and performs a second TLB lookup in the second TLB based on the second prefetch request.

According to yet another non-limiting embodiment, a computer program product is provided to control a computer system to perform prefetching in a computer processing system. The computer program product comprises a computer readable storage medium having program instructions embodied therewith. The program instructions are executable by an electronic computer processor to control the computer system to perform operations comprising generating a demand access stream, and generating a first prefetch request and a second prefetch request based on the demand access stream. The operations further comprises outputting the first prefetch request to a first translation lookaside buffer (TLB) and the second prefetch request to a second TLB that is different from the first TLB, performing a first TLB lookup in the first TLB based on one of the demand access stream or the first prefetch request, and performing a second TLB lookup in the second TLB based on the second prefetch request.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
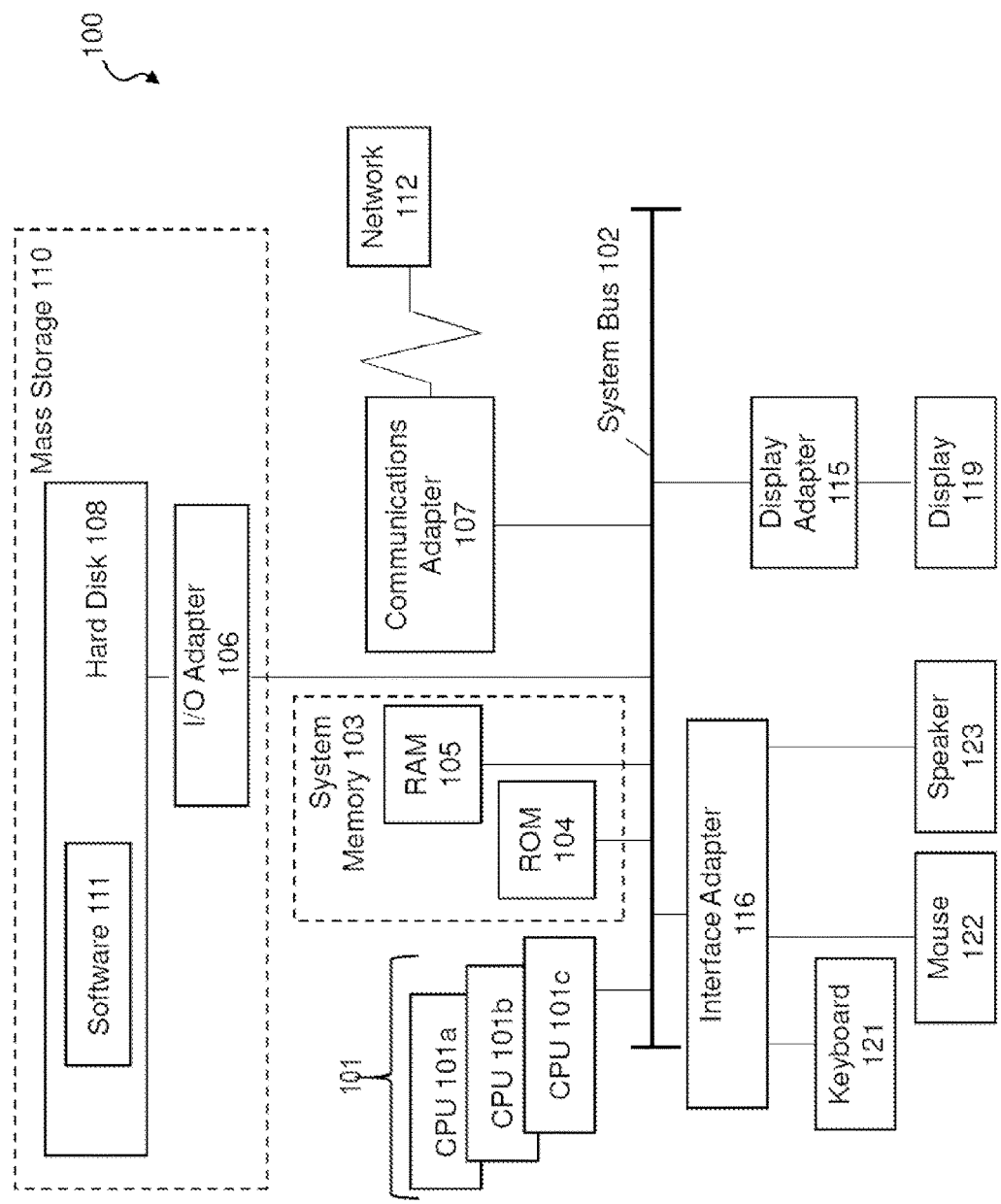
FIG. 1 depicts a block diagram of a computer system for implementing some or all aspects of one or more non-limiting embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Modern computing processing systems are known to implement processors capable of selectively operating in a "virtual mode" and a "real mode." The virtual mode is used in conjunction with a dynamic address translation scheme to provide computing system with a virtual memory that appears to be larger than the physical main memory of the computing system. Addresses used to designate locations in the virtual memory are often referred to as virtual addresses (VAs) that serve as indexes to real addresses (RAs) of the physical main memory storing the data. Accordingly, the virtual mode is invoked when translating VAs into corresponding RAs.

In the real mode, however, no virtual address translation is performed. That is, the effective address (EA), i.e., the address of the program or compiler, is used as the RA. If the EA does not correspond to the RA, then the computer processing system may experience what is commonly referred to as a "check stop." A check stop may refer to crashing of the computer processing system as a result of attempting to locate a RA that does not exist in physical main memory.

As mentioned herein, computing processing system can implement prefetching data schemes to increase data fetching speeds. Some known prefetching data schemes employ an EA based prefetcher to facilitate data prefetching. The EA based prefetcher relies on the Memory Management Unit (MMU) to convert EAs into their corresponding real addresses (RAs) for the lines that it wants to prefetch. As mentioned above, no translation is required when the system operates in the real mode. The MMU, however, must still perform prefetch checks that include verifying the addresses in question actually exist in the physical memory and theses addresses satisfy any security requirements (related to protection). Typically, only the highest-level translation lookaside buffer (TLB) (e.g., sometimes referred to as "L0 TLB" or referred to as Effective To Real Translation (ERAT)) will perform these prefetch checks. In this scheme, a memory request can be made once all of the prefetch checks are passed and verified.

Various known computing architectures are designed such that the translation workload from the prefetcher is split between multiple levels of TLBs. In these split-level architectures, a portion of the translation (i.e., portion(s) sent to lower level TLBs for processing) cannot be performed in real mode because only the first level TLB, e.g., the ERAT, is capable of performing the required prefetch checks.

According to one or more non-limiting embodiments, a computer processing system is provided that employs a unique MMU that does not limit the prefetch checks to only the first level TLB, e.g., the ERAT. In one or more non-limiting embodiments, the MMU is uniquely constructed such that one or more MMU sub-components can perform a portion of the prefetch checks.

FIG. 1 illustrates a computer system 100 configured to implement some or all aspects of one or more non-limiting embodiments of the invention. The computer system 100 can be an electronic, computer framework comprising and/ or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS), which controls certain basic functions of the computer system 100. The RAM 105 is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
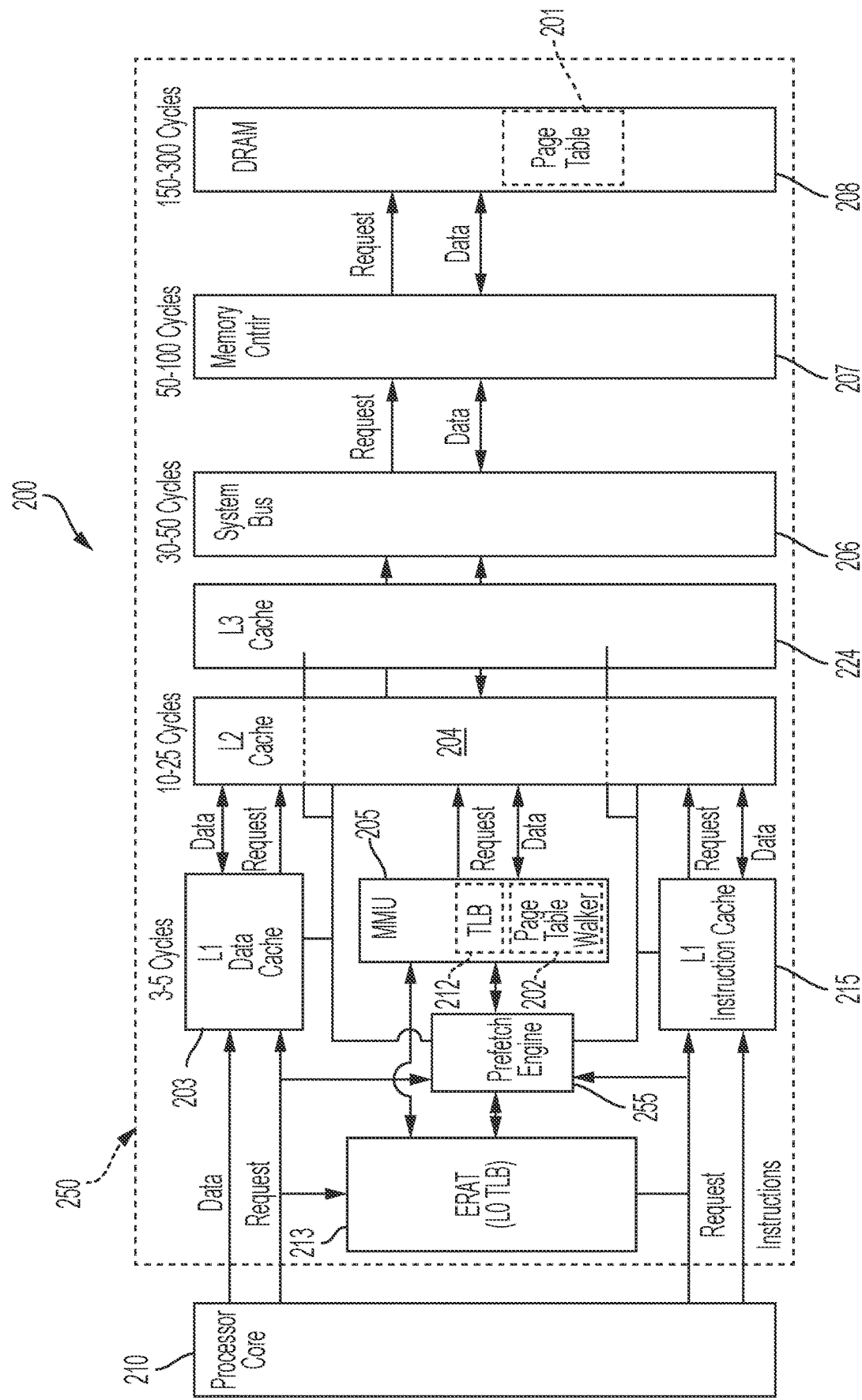
FIG. 2 depicts a block diagram of a computer processing system configured to perform cache prefetching according to non-limiting embodiments of the invention.

Turning now to FIG. 2, a computer processing system 200 configured to perform cache prefetching according is illustrated according to non-limiting embodiments of the invention. The computer processing system 200 includes a processor 210 in signal communication with a memory system 250. The processor 210 can be constructed as a central processing unit (CPU) configured to execute an operating system (OS).

The memory system 250 includes several levels of data caches (e.g., L1 data cache 203, L2 data cache 204 and L3 data cache 224), a memory management unit (MMU) 205, a system bus 206, a memory controller 207, main memory (DRAM) 208, an ERAT 213, and a prefetch engine 255. The data caches 203, 204 and 223 are relatively smaller than the main memory 208, but run faster than the main memory 208. In a non-limiting embodiment, the data caches 203, 204 and 224 are designed according to a cache hierarchy. For example, the L1 data cache 203 is considered a larger-sized higher-level cache compared to the L2 data cache 204 and the L3 data cache 224, and the L2 cache 204 is considered a larger-sized higher-level cache compared to the L3 data cache 224. In addition, the L1 data cache 203 is considered a faster cache compared to the L2 data cache 204 and the L3 data cache 224, and the L2 data cache 204 is considered a faster cache compared to the L3 data cache 224. As described herein, the prefetch engine 255 can monitor the demand access stream generated by the processor 210 and issue prefetch requests such that data can be loaded from the larger, slower main memory 208 to the relatively smaller, faster data caches 224, 204 and 203 in order to make it more readily available to the processor 210 when needed.

The MMU 205 includes one or more translation lookaside buffers (TLB s) 212, and a page table walker 202. The MMU 205 executes a selected paging algorithm to determine and maintain the current mappings from virtual addresses (VAs) to RAs using one or more page tables (PTs) 201. When an address is received from an execution unit in the processor 210, the MMU 205 will translate a VA to an RA using the page tables 201. In one or more non-limiting embodiments, the page tables 201 can be located in the main memory (e.g., DRAM 208) and the page table walker 202 can be invoked to access the page tables 201, and provide appropriate translation. It should be appreciated that the location of the table walker 202 is not limited to the MMU 205 can be located elsewhere such as the memory controller 207, for example, without departing from the scope of the invention. When the processor 210 executes memory access instructions (e.g. load, store) while operating in the virtual mode, it presents an EA to the L1 data cache 203. The MMU 205 converts the EA into the corresponding RA, which is required for accessing the data (including in some systems, an intermediate VA).

The ERAT 213 can serve as a highest-level TLB (e.g., L0 TLB) and caches a limited number of previous ERATs in anticipation of their reuse. Although the ERAT 213 is shown as being external from the MMU 205, it should be appreciated that the ERAT 213 can be located elsewhere such as integrated in the MMU 205, for example, without departing from the scope of the invention. If the required translation is found in the ERAT 213, the process within the MMU 205 can be bypassed. A similar process occurs when the processor 210 fetches new instructions for execution. Once the RA is determined, it may be used to validate an entry found in the L1 instruction cache 215 or if no match is found in the L1 cache 215, the RA is presented to the L2 cache 204. In cases where there is also no match found in the L2 204 cache, the RA is propagated to the memory subsystem (e.g., lower level caches) to access the required data.

A unique address translation is required for each memory page. As an example, a page may contain 4 kilobytes (KB), 64 kilobytes, or other larger amounts of DRAM 208 storage. The TLBs 212 contain an entry for each of the most recently required translation. Requests for entries can be loaded in a buffer or "mailbox" before they are submitted to a given TLB 212, which processes one request per cycle. Occasionally, an address will be presented to the MMU 205 that doesn't have a matching translation in the TLBs 212. When this happens, a TLB miss is declared, and the page table walker 202 is activated to search the complete PT 201 stored in DRAM 208. The page table walker 202 typically includes a hash function to facilitate one or more memory accesses and processing of individual page table entries (PTEs) in the resulting data to locate the required PTE. Once the page table walker 202 has retrieved the required PTE, this new PTE is used to complete the required address translation, and the pending memory access process continues as with normal accesses. The new PTE displaces another PTE within a respective TLB 212, based on time since last use. A last recently used (LRU) mechanism similar to that used in caches determines which previous TLB entry to displace.

The prefetch engine 255 is in signal communication with the processor 210, the ERAT 213 and the MMU 205. The prefetch engine 255 is configured to monitor the demand access requests sent from the processor 210 and output prefetch demands to the MMU 205 indicating EAs for page lines it desires to prefetch. In one or more non-limiting embodiments, the prefetch engine 255 can generate a stream of highly-speculative leading prefetch requests (e.g., an L3 prefetch request), which can then be passed to the data caches 203, 204 and 224 according to the cache hierarchy. Thus, in contrast to demand accesses (e.g., demand load requests), the leading prefetch requests (as well as other prefetch requests) are not generated in response to execution of an instruction set architecture (ISA) instruction by the instruction execution circuitry of the processor 210, but are rather generated by the prefetch engine 255 in anticipation of execution of one or more ISA instructions that implicitly or explicitly indicate a memory access. Although the leading prefetch requests accesses each data cache 203, 204, 224 of the cache hierarchy, it is generally the case that the target memory blocks of leading prefetch requests do not initially reside in the cache memory hierarchy and or obtained from the main memory 208 and passed up the cache hierarchy.

Subsequent to a leading prefetch request and nearer in time to an anticipated demand memory access request (e.g., demand load or store request), the prefetch engine 255 can issue a corresponding trailing prefetch request (e.g., an L1 prefetch request) targeting the same target memory block. The trailing prefetch requests are typically much less speculative than the leading prefetch requests. Although trailing prefetch requests also access each data cache 203, 204, 224 of the cache hierarchy it is generally the case that the target memory block of a trailing prefetch request initially resides only in L3 data cache 224 as a result of the earlier corresponding leading prefetch request. Accordingly, the L3 data cache 224 generally services a trailing prefetch request by supplying the target memory block of the trailing prefetch request to one or more higher levels of cache memory as prefetch data.

When a demand load misses the L1 cache, it allocates a Load Miss Queue entry and attempts translation via the ERAT (e.g., L0 TLB). When operating in the virtual mode, the ERAT 213 returns the real address of the miss and performs security checks. After all checks are passed, the ERAT 213 allows the demand miss to be sent out of the processor 210 and the Load Miss Queue is updated accordingly. In the real mode, however, the miss will wait until it is the next to complete (NTC) instruction before the ERAT 213 services the load. As described herein, no translation is performed when operating in the real mode, but the ERAT 213 will still ensure that the load is safe before it is sent out of the processor 210 and the Load Miss Queue is updated accordingly.

In addition, when operating in the virtual mode a Prefetch Request Queue (PRQ) included in the prefetch engine 255 can allocate a new prefetch stream at any point, including when a load miss occurs. In the real mode, however, the PRQ in the prefetch engine 255 is only allowed to allocate after an LMQ entry has been allocated and has been allowed to send its miss request out of the processor 210 (i.e. after passing strict address checks performed by the ERAT 213) to ensure that the prefetches that follow the load are safe.

In one or more non-limiting embodiments, the computer processing system 200 ensures that a prefetch does not occur beyond the page boundary for the page size defined in the real mode. In order to ensure that no future prefetches violate any protections (e.g., that no check fails occur), the prefetch engine 255 utilizes the PRQ to records the page size that is defined for the real mode. In a non-limiting embodiment, the computing processing system 200 uses 4 kilobyte and 2 megabyte pages, but other pages sizes can be employed without departing from the scope of the invention. The prefetch engine 255 then assumes that accesses to the page where the PRQ stream was allocated are safe (i.e., because at this stage the initial load has passed all checks performed by the ERAT 213), but prevents any prefetches from being sent past the page boundary defined by the system 200.

In some instances, the control logic of the prefetch engine 255 may initiate an L3 cache prefetch operation in response, for example, to a demand load during instruction processing (e.g., monitoring the demand access generated by the processor 210). The L3 data cache 224 is a larger cache compared to the L1 data cache 203, but runs slower than the L1 data cache 203. Accordingly, L3 prefetches will be sent prior to L1 prefetches and in enough time for the data to be loaded from the main memory 208 into the L3 data cache 224 so that the prefetch data loaded in the L3 data cache 224 can be passed to the L1 data cache 203.

In a non-limiting embodiment of the invention, when the prefetch engine 255 outputs an L3 prefetch to the last line in the system-defined real page the demand access stream is deallocated to prevent any further prefetching. If the demand stream of accesses continues past the page boundary, the first load in the new page will once again miss the cache because the prefetch engine 255 stops prefetching at the boundary. Therefore, new PRQ stream is allocated after its request is sent. In this manner, the computer processing system provides an allocation rule and prefetching rule that ensure that no unsafe prefetches are sent out when operating in the real mode.

Figure 3:
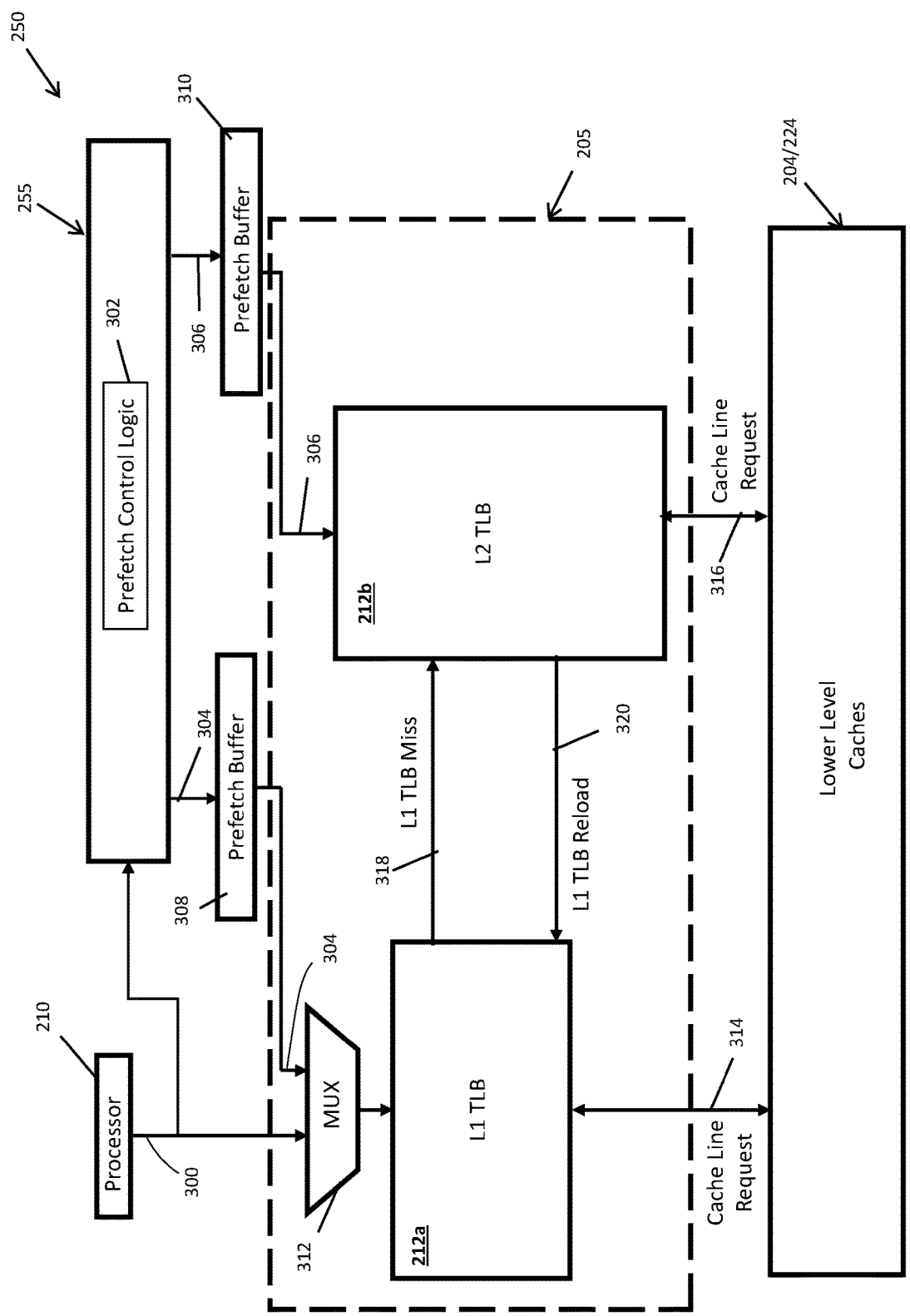
FIG. 3 is a block diagram illustrating a portion of a memory system included in a computer processing system to perform cache prefetching according to non-limiting embodiments of the invention.

With reference now to FIG. 3, a portion of the memory system 250 configured to perform cache prefetching is illustrated according to a non-limiting embodiment of the invention. As described herein, the memory system 250 includes a prefetch engine 255 in signal communication with an MMU 205. The prefetch engine 255 monitors the demand access stream 300 generated by the processor 210. The demand access stream 300 can include one or more load or store instructions, for example, which provide an EA that is to be translated into a RA by the MMU 205. Based on the demand access stream 300, prefetch control logic 302 included in the prefetch engine 255 outputs either L1 prefetch requests 304 or L3 prefetch requests 306. In one or more non-limiting embodiments, the prefetch control logic 302 can choose to generate an L3 prefetch request 306 based on the demand load determined in response to monitoring the demand access stream 300. For example, when the demand load indicated by the demand access stream 300 exceeds a predetermined threshold, the prefetch logic can generate an L3 prefetch request rather than an L1 prefetch request so as to manage the load and latency of the MMU 205.

The MMU 205 includes a first-level TLB (L1 TLB) 212a and a second-level TLB (L2 TLB) 212b. In one or more embodiments, the L1 TLB 212a is sized smaller than the L2 TLB 212b, but can be processed faster (e.g., "walked" by page table waler 202) than the L2 TLB 212b. The memory system 250 further includes first and second prefetch buffers (sometimes referred to as prefetch "mailboxes) 308 and 310 to facilitate data interfacing between the L1 TLB 212a and the L2 TLB 212b. As described herein, the prefetch control logic 302 can choose to generate an L3 prefetch request 306 (e.g., instead of an L1 prefetch request 304) based on the demand load (e.g., associated with the L1 TLB 212a) indicated by the demand access stream 300. Therefore unlike conventional memory systems that provide a single common prefetch buffer for managing the L1 prefetch requests 304 and the L3 prefetch requests 306, the first and second prefetch buffers 308 and 310 independently handle the L1 prefetch requests 304 and the L3 prefetch requests 306. Also, unlike conventional memory systems which provide a single pipeline to deliver both L1 and L3 prefetch requests to a common L1 TLB, the first and second prefetch buffers 308 and 310 provide dedicated interfaces or "pipelines" between the prefetch engine 255 and the L1 and L2 TLBs 212a and 212b, respectively.

In one or more non-limiting embodiments, the MMU 205 includes a multiplexer (MUX) 312. The MUX 312 includes a first input that receives the demand access stream 300 and a second input that receives an L1 prefetch request 304 output from the first prefetch buffer 308. An output from the MUX 312 provides the L1 TLB 212a with either a demand access included in the demand access stream 300 or the VA of L1 prefetch request 304 in a given cycle based on logic controlled by the MMU 205.

The output from the second prefetch buffer 310 provides the VA of an L3 prefetch request 306 directly to the L2 TLB 212b. This forces the L2 TLB 212b to manage the highly-speculative L3 prefetch requests 3065 and allows the L1

TLB to manage the less-speculative L1 prefetch requests 304. Accordingly, a TLB lookup can be performed on the L2 TLB 212b using the L3 prefetch requests independently from the TLB lookup performed on the L1 TLB 212 (i.e., performed using the demand access 300 or the L1 prefetch request 304). In this manner, the pipeline design of the memory system 250 according to one or more non-limiting embodiments reduces the latency of the L1 TLB 212a and optimize translation bandwidth. In addition, one or more non-limiting embodiments allows for performing the TLB lookup on the L2 TLB 212b and the TLB lookup performed on the L1 TLB 212a simultaneously. Accordingly, overall latency of the system 200 can be further reduced.

The L1 TLB 212a and the L2 TLB 212b are each in signal communication with the lower level caches 204 and 224. In response to a TLB hit in the L1 TLB 212a the VAs of the demand accesses 300 and the L1 prefetch requests 304 are translated into their corresponding RAs 314, and the RAs are delivered to the main memory 208. Similarly, in response to a TLB hit in the L2 TLB 212b, VAs of the L3 prefetch requests 306 are translated into their corresponding RAs, and the RAs 316 are delivered to the main memory 208.

The L1 TLB 212a is also in signal communication with the L2 TLB 212b. A TLB lookup will be performed to determine if the VA associated with the demand access 300 or the L1 prefetch request 304 is included in the L1 TLB 212a. When the VA is found in the L1 212a, a TLB hit is detected, the VA is translated into its corresponding RA, and the RA is delivered to the main memory 208. When the VA is not included, an TLB miss is determined, and the L1 TLB 212a outputs an L1 TLB miss signal 318 (including the missed VA) to the L2 TLB 212b.

In response to receiving the L1 TLB miss signal 318, the L2 TLB 212b will perform a TLB lookup using the VA associated with the missed demand access 300 or the missed L1 prefetch request. When the VA is included in the L2 TLB 212b, the RA will be determined and the L2 TLB 212b will provide the L1 TLB 212a with a L1 TLB reload signal 320 that includes both the initial VA associated with the missed demand access 300 or the missed L1 prefetch request, along with the translated RA. In this manner, the L1 TLB 212a can complete the RA translation and output the RA 314 to the main memory 208. The L1 TLB reload signal 230 is utilized to reload the L1 TLB 212a with the aim of accessing the L1 TLB 212a again in a future translation operation. By reloading the L1 TLB 212a such that its next access is faster on a corresponding L1 TLB hit. When, the VA associated with the missed demand access 300 or the missed L1 prefetch request is not included in the L2 TLB 212b, the MMU 205 will perform lookups on lower level TLBs or will perform a table walk on the last line of the system-defined real page.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing prefetching in a computer processing system, the method comprising:
    generating, by a processor, a demand access stream;
    generating, by a prefetch engine, a first prefetch request and a second prefetch request based on the demand access stream;
    outputting, from the prefetch engine, the first prefetch request to a first translation lookaside buffer (TLB) and the second prefetch request to a second TLB that is different from the first TLB; and
    performing a first TLB lookup in the first TLB based on one of the demand access stream or the first prefetch request, and performing a second TLB lookup in the second TLB based on the second prefetch request, wherein the first TLB lookup and the second TLB lookup are performed simultaneously, wherein generating the first and second prefetch requests further comprises:
    monitoring, by the prefetch engine, the demand access stream;
    determining a demand load associated with the first TLB in response to monitoring the demand access stream;
    generating the first prefetch request in response to the demand load being less than or equal to a demand threshold; and
        generating the second prefetch request in response to the demand load exceeding the demand threshold.

2. The computer-implemented method of claim 1, wherein performing the first TLB lookup further comprises:
    outputting a first virtual address (VA) included in the demand access stream from the processor;
    outputting a second VA included in the first prefetch request from the prefetch engine;
    selectively delivering one of the first VA or the second VA to the first TLB; and
    performing the first TLB lookup based on the first VA or the second VA delivered to the first TLB.

3. The computer-implemented method of claim 2, wherein performing the second TLB lookup further comprises:
    outputting a third VA included in the second prefetch request to the second TLB; and
    performing the second TLB lookup based on the third VA.

4. The computer-implemented method of claim 3, outputting the first and second prefetch requests further comprises:
    outputting the second VA to a first prefetch buffer;
    outputting the third VA to a second prefetch buffer that is separate from the first prefetch buffer;
    outputting the second VA from the first prefetch buffer to the first TLB; and
    outputting the third VA from the second prefetch buffer to the second TLB independently from outputting the second VA from the first prefetch buffer.

5. The computer-implemented method of claim 2, further comprising:
    in response to a TLB hit associated with the first TLB lookup, translating the first VA or the second VA into a real address (RA);
    in response to a TLB miss associated with the first TLB lookup, outputting the first VA or the second VA to the second TLB;
    performing a third TLB lookup in the second TLB based on the first VA or the second VA;
    in response to a TLB hit associated with the third TLB lookup, determining a RA corresponding to the first VA or the second VA, and returning the RA corresponding to the first VA or the second VA to the first TLB; and
    translating, using the first TLB, the first VA or the second VA using the RA obtained from the second TLB.

6. A computer system comprising:
    a processor configured to generate a demand access stream;
    a prefetch engine configured to generate a first prefetch request and a second prefetch request based on the demand access stream, to output the first prefetch request to a first translation lookaside buffer (TLB), and to output the second prefetch request to a second TLB that is different from the first TLB,
    wherein the processor performs a first TLB lookup in the first TLB based on one of the demand access stream or the first prefetch request, and performs a second TLB lookup in the second TLB based on the second prefetch request, wherein the first TLB lookup and the second TLB lookup are performed simultaneously,
    wherein the prefetch engine generates the first and second prefetch requests in response to monitoring the demand access stream, determining a demand load associated with the first TLB in response to monitoring the demand access stream, generating the first prefetch request in response to the demand load being less than or equal to a demand threshold, generating the second prefetch request in response to the demand load exceeding the demand threshold.

7. The computer system of claim 6, wherein the processor performs the first TLB lookup in response to outputting a first virtual address (VA) included in the demand access stream from the processor, outputting a second VA included in the first prefetch request from the prefetch engine, selectively delivering one of the first VA or the second VA to the first TLB, and performing the first TLB lookup based on the first VA or the second VA delivered to the first TLB.

8. The computer system of claim 7, wherein the processor performs the second TLB lookup in response to outputting a third VA included in the second prefetch request to the second TLB, and performing the second TLB lookup based on the third VA.

9. The computer system of claim 8, outputting the processor performs the first and second prefetch requests in response to outputting the second VA to a first prefetch buffer, outputting the third VA to a second prefetch buffer that is separate from the first prefetch buffer, outputting the second VA from the first prefetch buffer to the first TLB, and outputting the third VA from the second prefetch buffer to the second TLB independently from outputting the second VA from the first prefetch buffer.

10. The computer system of claim 7, wherein in response to a TLB hit associated with the first TLB lookup, the processor translates the first VA or the second VA into a real address (RA), wherein in response to a TLB miss associated with the first TLB lookup, the processor outputs the first VA or the second VA to the second TLB.

11. The computer system of claim 10, wherein the processor performs a third TLB lookup in the second TLB based on the first VA or the second VA, and
    in response to a TLB hit associated with the third TLB lookup, the processor determines a RA corresponding to the first VA or the second VA, returns the RA corresponding to the first VA or the second VA to the first TLB, and uses the first TLB to translate the first VA or the second VA using the RA obtained from the L2 TLB.

12. A computer program product to control a computer processing system to perform prefetching, the computer program product comprising a computer readable storage medium having program instructions embodied therewith, the program instructions executable by an electronic computer processor to control the computer processing system to perform operations comprising:
    generate a demand access stream;
    generate, by a prefetch engine, a first prefetch request and a second prefetch request based on the demand access stream;
    output, from the prefetch engine, the first prefetch request to a first translation lookaside buffer (TLB) and the second prefetch request to a second TLB that is different from the first TLB;
    perform a first TLB lookup in the first TLB based on one of the demand access stream or the first prefetch request; and perform a second TLB lookup in the second TLB based on the second prefetch request,
wherein the first TLB lookup and the second TLB lookup are performed simultaneously,
wherein generating the first and second prefetch requests further comprises:
monitoring, by the prefetch engine, the demand access stream;
determining a demand load associated with the first TLB in response to monitoring the demand access stream;
generating the first prefetch request in response to the demand load being less than or equal to a demand threshold; and
generating the second prefetch request in response to the demand load exceeding the demand threshold.

13. The computer program product of claim 12, wherein performing the first TLB lookup further comprises:
outputting a first virtual address (VA) included in the demand access stream from the processor;
outputting a second VA included in the first prefetch request from the prefetch engine;
selectively delivering one of the first VA or the second VA to the first TLB; and
performing the first TLB lookup based on the first VA or the second VA delivered to the first TLB.

14. The computer program product of claim 13, wherein performing the second TLB lookup further comprises:
outputting a third VA included in the second prefetch request to the second TLB;
performing the second TLB lookup based on the third VA;
outputting the second VA to a first prefetch buffer;
outputting the third VA to a second prefetch buffer that is separate from the first prefetch buffer;
outputting the second VA from the first prefetch buffer to the first TLB; and
outputting the third VA from the second prefetch buffer to the second TLB independently from outputting the second VA from the first prefetch buffer.

\* \* \* \* \*